US009626317B2

(12) United States Patent
Bacigalupo et al.

(10) Patent No.: US 9,626,317 B2
(45) Date of Patent: *Apr. 18, 2017

(54) ARBITER FOR ASYNCHRONOUS STATE MACHINES

(71) Applicant: Infineon Technologies Austria AG, Villach (AT)

(72) Inventors: Tommaso Bacigalupo, Fuerstenfeldbruck (DE); Torsten Hinz, Augsburg (DE)

(73) Assignee: Infineon Technologies Austria AG, Villach (AT)

( * ) Notice: Subject to any disclaimer, the term of this patent is extended or adjusted under 35 U.S.C. 154(b) by 383 days.

This patent is subject to a terminal disclaimer.

(21) Appl. No.: 14/292,040

(22) Filed: May 30, 2014

(65) Prior Publication Data

US 2014/0281086 A1    Sep. 18, 2014

Related U.S. Application Data

(63) Continuation-in-part of application No. 13/482,753, filed on May 29, 2012, now Pat. No. 8,990,466.

(51) Int. Cl.
 *G06F 12/00* (2006.01)
 *G06F 13/364* (2006.01)
 *G06F 13/14* (2006.01)

(52) U.S. Cl.
 CPC ......... *G06F 13/364* (2013.01); *G06F 13/14* (2013.01)

(58) Field of Classification Search
 CPC .................. G06F 13/14; G06F 13/364
 USPC ........................ 710/113–125, 309
 See application file for complete search history.

(56) References Cited

U.S. PATENT DOCUMENTS

| 3,735,357 A | * | 5/1973 | Maholick | ............... H04L 5/02 710/40 |
| 5,237,692 A | * | 8/1993 | Raasch | ................ G06F 1/325 710/267 |
| 5,241,541 A | | 8/1993 | Farrell et al. | |
| 5,404,556 A | | 4/1995 | Mahowald et al. | |
| 5,489,865 A | * | 2/1996 | Colvin, Sr. | ............ H03K 19/21 326/94 |

(Continued)

OTHER PUBLICATIONS

Hauck, S., "Asynchronous Design Methodologies: An Overview," Proceedings of the IEEE, vol. 83, No. 1, Jan. 1995, pp. 69-93.

(Continued)

*Primary Examiner* — Paul R Myers
(74) *Attorney, Agent, or Firm* — Slater Matsil, LLP (57) ABSTRACT

An arbiter can be used for processing a plurality of asynchronous data signals. Each data signal is associated with a request signal and a respective acknowledge signal. The arbiter includes a latch array with an input coupled to receive the data signals and request signals and an output coupled to provide a data vector and a validity vector. The data vector includes values depending on the data signals and the validity vector includes values depending on the request signals when the latch array is in a transparent state. Logic circuitry is configured to trigger the latch array when any of the request signals becomes active, to activate a global request signal a delay time after the latch has been triggered, and to selectively activate the acknowledge signals for a channel or channels for which an active request signal has been latched.

25 Claims, 8 Drawing Sheets

(56) References Cited

U.S. PATENT DOCUMENTS

| | | | |
|---|---|---|---|
| 5,555,413 A * | 9/1996 | Lohman | G06F 9/4812 710/260 |
| 5,594,876 A | 1/1997 | Getzlaff et al. | |
| 5,805,838 A * | 9/1998 | Sutherland | G06F 13/364 710/112 |
| 5,913,045 A * | 6/1999 | Gillespie | G06F 13/24 710/266 |
| 6,035,361 A * | 3/2000 | Kim | G06F 13/364 710/113 |
| 6,104,215 A * | 8/2000 | Schindler | G01R 19/16557 327/217 |
| 6,424,655 B1 | 7/2002 | Horst | |
| 6,868,529 B1 | 3/2005 | Frannhagen | |
| 7,110,360 B1 | 9/2006 | Hui et al. | |
| 7,395,360 B1 | 7/2008 | Pritchard et al. | |
| 8,334,712 B2 * | 12/2012 | Klein | H03L 7/00 327/141 |
| 2005/0182878 A1 | 8/2005 | Lehongre | |
| 2009/0024777 A1 | 1/2009 | Hirotsu et al. | |
| 2009/0204933 A1* | 8/2009 | Rezgui | H03K 19/0033 716/122 |
| 2011/0121857 A1 | 5/2011 | Nowick et al. | |
| 2013/0326100 A1 | 12/2013 | Bacigalupo | |

OTHER PUBLICATIONS

Mullins, R. et al., "Demystifying Data-Driven and Pausible Clocking Schemes," 13th IEEE International Symposium on Asynchronous Circuits and Systems (ASYNC'07), Mar. 2007, 11 pages.

Sparsø, J., ed., "Mutual Exclusion, arbitration and metastability," Principles of Asynchronous Circuit Design—A Systems Perspective, Section 5.8, 2001, 354 pages, Kluwer Academic Publishers.

Sutherland, I., "Turning Award; Micropipelines," Communications of the ACM, vol. 32, No. 6, Jun. 1989, pp. 720-738.

"C-element," Wikipedia, http://en.wikipedia.org/wiki/C-element, dated Oct. 15, 2013, 3 pgs.

* cited by examiner

ARBITER FOR ASYNCHRONOUS STATE MACHINES

This application is a continuation-in-part of patent application Ser. No. 13/482,753, filed on May 29, 2012, which application is incorporated herein by reference in its entirety.

TECHNICAL FIELD

The present invention generally relates to the field of asynchronous circuit design. More particular the invention relates to arbiters for handling multiple (almost) simultaneously switching inputs and the application of such arbiters in asynchronous state machines.

BACKGROUND

Most digital circuits designed and fabricated today are "synchronous." In essence, synchronous circuits are based on two fundamental assumptions that greatly simplify their design: (1) all signals are binary, and (2) all components share a common and discrete notion of time, as defined by a clock signal distributed throughout the circuit.

Asynchronous circuits are fundamentally different. They also assume binary signals, but there is no common and discrete time. Instead the circuits use handshaking between their components in order to perform the necessary synchronization, communication, and sequencing of operations. Expressed in terms usually used with regard to synchronous circuits this results in a behaviour that is similar to a systematic fine-grain clock gating and local clocks that are not in phase and whose periods are determined by actual circuit delays. This difference gives asynchronous circuits inherent properties that may be advantageous (with respect to, e.g., power consumption, operating speed, electromagnetic emission, robustness towards variations in supply voltage, temperature, fabrication process parameters, etc.) as compared to synchronous (clocked) circuits.

On the other hand there are also some drawbacks. Asynchronous circuits usually require a control logic for implementing handshake operations that are necessary to synchronize different circuit elements as a global clock signal does not exist. The asynchronous control logic that implements the handshaking normally represents an overhead in terms of circuit complexity.

Important handshaking components that are commonly used to implement the mentioned handshake operations require that the communication along several (input) channels is mutually exclusive, at least at a point at which two channels are merged into a common channel (see, e.g., Jens Sparsø, ed.: Section 5.8 "Mutual exclusion, arbitration and metastability," in: PRINCIPLES OF ASYNCHRONOUS CIRCUIT DESIGN—A Systems Perspective, Kluwer Academic Publishers, 2001). That is, a high-low transition (or vice versa) may only occur in one single channel at a given time. Simultaneous "events" in two or more channels are usually handled by arbiters that use so-called mutex elements to decide which event to process first. However, mutex elements are subject to undesired metastability effects when two events occur simultaneously or almost simultaneously (i.e., within a short time interval).

Particularly when implementing finite state machines (FSMs) concurrently occurring events in different communication channels (e.g., on different signalling lines) may be problematic and appropriate arbitration circuits (arbiters) may be significantly complex. There is a need for an easy-to-synthesize state machine including an arbiter for handling concurrent events in different communication channels.

SUMMARY OF THE INVENTION

An arbiter for processing a plurality of asynchronous data signals is disclosed. Each data signal is associated with a respective request signal and a respective acknowledge signal. In accordance with one example of the invention the arbiter includes a latch array receiving, as input signals, the data signals and request signals and providing, as output signals, a data vector and a corresponding validity vector. The data vector includes values depending on the data signals and the validity vector includes values depending on the request signals when the latch is in a transparent state. The arbiter further includes logic circuitry that is configured to monitor the request signals and to trigger the latch (i.e., to "freeze" the latch output) when any of the request signals becomes active. The logic circuitry is further configured to activate a global request signal a delay time after the latch has been triggered and to selectively activate the acknowledge signals for the channel(s) for which an active request signal has been latched.

BRIEF DESCRIPTION OF THE DRAWINGS

The invention can be better understood with reference to the following drawings and description. The components in the figures are not necessarily to scale, instead emphasis being placed upon illustrating the principles of the invention. Moreover, in the figures, like reference numerals designate corresponding parts. In the drawings:

FIG. 1, which includes

FIG. 2, which includes

FIG. 3, which includes

DETAILED DESCRIPTION OF ILLUSTRATIVE EMBODIMENTS

Figure 1A:
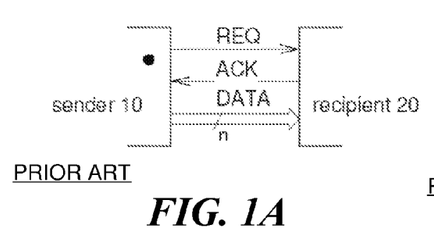
FIGS. 1a and 1b, illustrates the handshake using request and acknowledge signals between a sender and a recipient in an asynchronous circuit.

In asynchronous circuits a global system clock is not required. Handshake operations are used instead for synchronizing different circuit components. FIG. 1a illustrates the data flow from a sender 10 to a recipient 20. A change in the data signal is signalled by the sender 10 via the request signal REQ and the reception of the data is signalled by the sender by the acknowledge signal ACK. The request and acknowledge signals are "bundled" with the data signals (labelled DATA in FIG. 1) and thus this concept is often referred to as "bundled data." The term bundled data refers to a situation where the data signals use normal Boolean levels to encode information, and where separate request and acknowledge signals are bundled with the data signals.

Figure 1B:
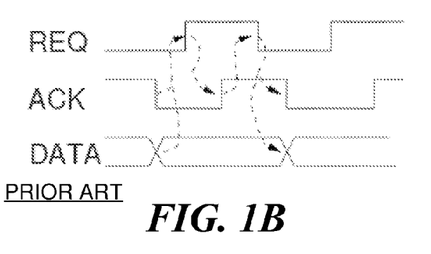

Different handshake protocols are known. The signals labelled DATA should be stable shortly before and while the request signal REQ is active (e.g., REQ=1). FIG. 1b illustrates, as an example, a four-phase protocol wherein the request and acknowledge signals REQ and ACK also use normal Boolean levels to encode information. The term "four-phase" refers to the number of communication actions: (1) the sender 10 issues data (data signals DATA) and sets the request signal REQ to a high level, (2) the recipient 20 receives the data and sets the acknowledge signal ACK to a high level as soon as the data has been properly received or processed, (3) the sender 10 responds by resetting the request signal REQ to a low level (at which point data is no longer guaranteed to be valid), and (4) the recipient 20 acknowledges this by resetting the acknowledge signal ACK to a low level. At this point the sender 10 may initiate the next communication cycle. Although the illustrated handshake protocol is very common, other protocols are also available and appropriate.

The protocol introduced above assumes that the sender 10 is the active party that initiates the data transfer over the channel. This is known as a push channel. The opposite, i.e., the recipient 20 asking for new data, is also possible and is called a pull channel. In this case the directions of the request and acknowledge signals REQ and ACK are reversed, and the validity of data is indicated in the acknowledge signal ACK going from the sender 10 to the recipient 20 (pull channels). In abstract circuit diagrams showing links/channels (like in FIG. 1a) as one symbol the active end of a channel is often marked with a dot. The data signals DATA may be omitted in cases where only synchronization of two circuit components is requires without the need for data exchange. Further the data flow may be bi-directional (push/pull channels). Although the further discussion concentrates on push channels the principles introduced herein may be also applied to pull channels and push/pull channels.

In view of the data exchange and synchronization mechanism illustrated in FIG. 1 it is clear that recipients receiving multiple input channels have to cope with (almost) simultaneously occurring requests (i.e., a transition in the request signal REQ). So-called "mutex elements" (mutex is a portmanteau word of "mutually" and "exclusive") are usually used to ensure that only one request (or, generally, one event) occurring in a specific one of a plurality of signals is forwarded to a receiver.

Figure 2A:
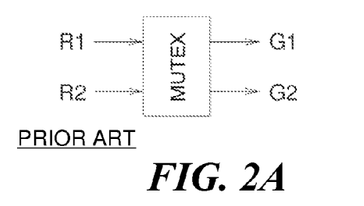
FIGS. 2a and 2b, illustrates one exemplary mutex element.

One exemplary mutex element (labelled MUTEX) is illustrated in FIG. 2. The input signals R1 and R2 are two requests that originate from two independent sources, and the task of the mutex element is to pass these inputs to the corresponding outputs G1 and G2 in such a way that at most one output is active (that is, e.g., at a high level) at any given time. If only one input request arrives the operation is trivial. If one input request arrives well before the other, the latter request is blocked until the first request is de-asserted. The problem arises when both input signals are asserted at the same time. Then the mutex element MUTEX is required to make an arbitrary decision, and this is where metastability enters the picture. As this issue of metastability is well known, it is not further discussed here.

Figure 2B:
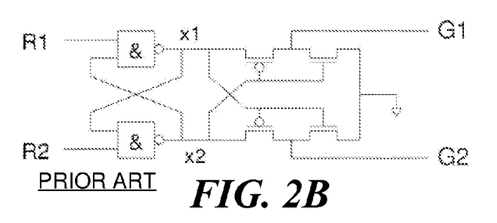

Reference is made to literature (see e.g., Jens Sparsø, ed.: Section 5.8, "Mutual exclusion, arbitration and metastability," in: PRINCIPLES OF ASYNCHRONOUS CIRCUIT DESIGN—A Systems Perspective, Kluwer Academic Publishers, 2001). In the example of FIG. 2b the mutex element is composed of a flip flop (implemented by the two NAND gate) and a metastability filter (implemented by the CMOS transistor circuit) arranged downstream thereof.

Figure 3A:
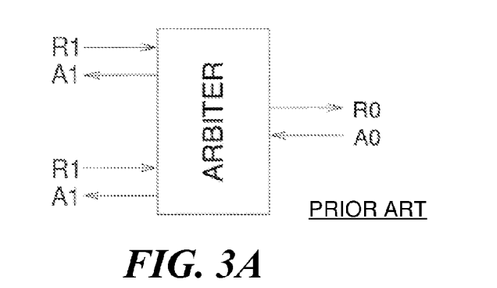
FIGS. 3a and 3b, illustrates an arbiter for handling two request signals directed to the same resource (e.g., recipient)

Mutex elements may be used to implement an arbiter, which can be used to control access to a resource (e.g., one recipient) that is shared between several autonomous independent parties (e.g., several senders). One possible implementation is shown in FIG. 3. As the illustrated arbiter implementation is also well known, only a rough explanation is given here and reference is made to the above-mentioned textbook of J. Sparsø.

Figure 3B:
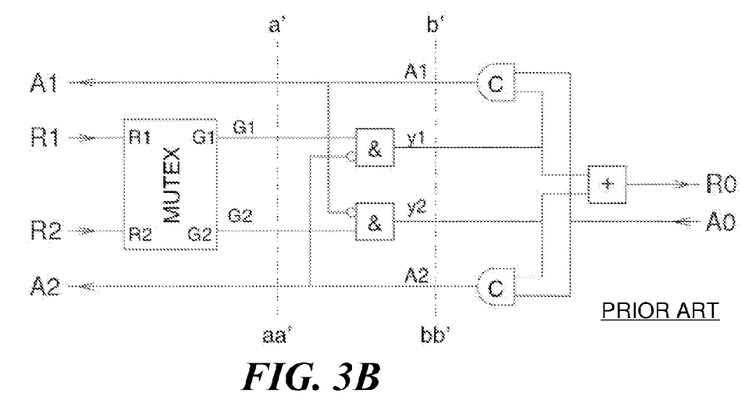

In the example of FIG. 3b the mutex element MUTEX ensures that (request) signals G1 and G2 (at the interface a'-aa') are mutually exclusive. Following the mutex element are two AND gates whose purpose it is to ensure that handshakes on the y1/A1- and y2/A2-channels (at the interface b'-bb') are mutually exclusive. That is, the request signal y2 can only go high if the acknowledge signal A1 is low and the request signal y1 can only go high if the acknowledge signal A2 is low. In this way, if handshaking is in progress along one channel, the arbiter blocks handshaking on the other channel. In cases where more than two inputs are to be handled by the arbiter, the arbiter circuit is significantly more complex. The gate labelled "C" is a Muller C-element which is also extensively discussed in the textbook of J. Sparsø mentioned above.

In cases where the arbiter is used to handle inputs supplied to a finite state machine (FSM) only one input signal can be processed by the FSM at a time instant. Furthermore, when handling a plurality of inputs a large number of mutex elements (e.g., arranged in a chain or a tree structure) are required wherein each mutex element has to cope with the mentioned problems arising from metastability which may significantly slow down the arbiter. In view of this, a novel arbiter has been developed which is able to handle a plurality of input channels thus allowing e.g., a finite state machine (FSM) to process a plurality of "events" (e.g., requests) in a single step. An example of the arbiter is described herein below with reference to FIGS. 4 and 5.

Figure 4:
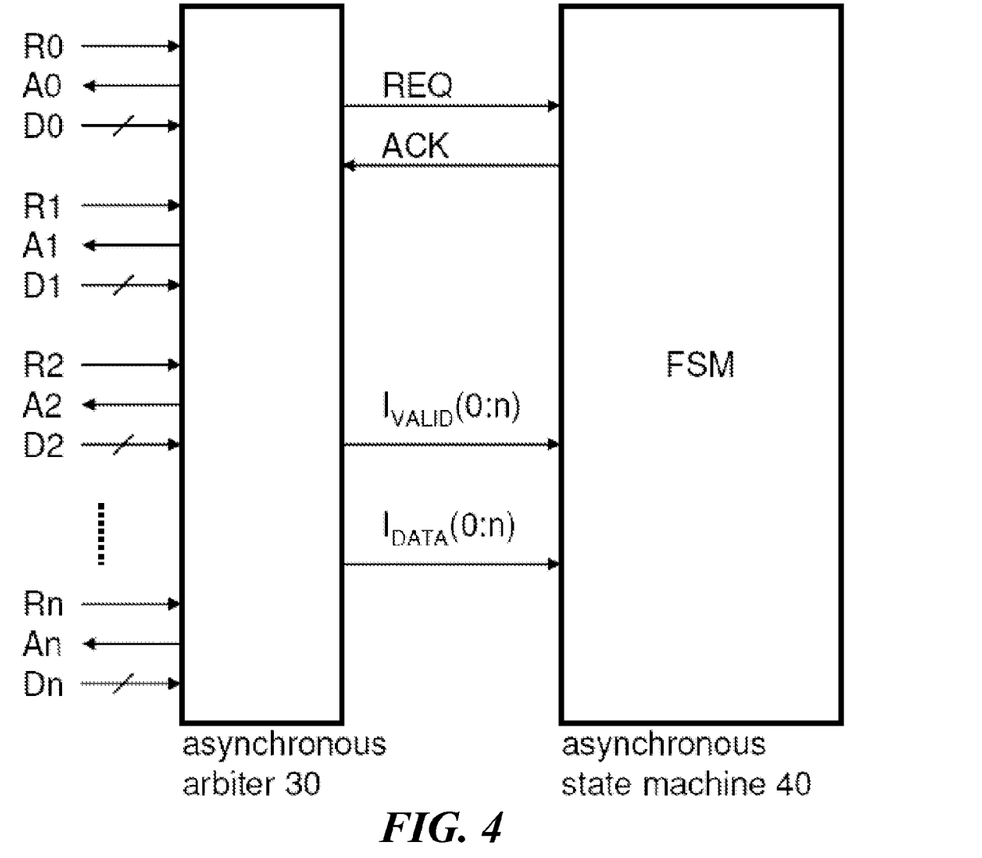
FIG. 4 illustrates an arbiter for handling a plurality of request signals in one step in accordance with one example of the invention and its application in connection with a finite state machine.

FIG. 4 illustrates a block diagram an asynchronously operating finite state machine 40 (FSM) which receives a plurality of input data signals D0, D1, D2, . . . , Dn, wherein each data signal D0, D1, D2, . . . , Dn, is associated with corresponding request signals R0, R1, R2, . . . , Rn, and acknowledge signals A0, A1, A2, . . . , An, to allow a handshake operation, e.g., as explained with respect to FIG. 1. The input data signals D0, D1, D2, . . . , Dn, and the corresponding request signals request signals R0, R1, R2, . . . , Rn, are not directly supplied to the FSM 40. The data and request signals Di, Ri (whereby i=0, 1, 2, . . . n) are rather supplied to an arbiter 30 which is configured to monitor the request signals Ri of all channels (channel 0 to channel n) simultaneously.

As soon as any request signal becomes active (e.g., assumes a high level) the values of all request and data signals Ri, Di are stored in latches (i.e., in a latch array). For this purpose the arbiter is configured to simultaneously monitor all request signals Ri for transitions (for signals becoming active). When one or more requests are detected and the signal values have been stored in the latch array the arbiter waits for a predefined time span to allow all latches to recover from possible meta-stable states. Finally one global request signal REQ is generated and supplied to the FSM 40. The latched values of the input data signals D0, D1, . . . , Dn are provided to the FSM 40 as data vector $i_{DATA}(0:n)$ wherein an additional data vector $i_{VALID}(0:n)$ is generated (validity vector) and provided to the FSM 40 which indicates the valid data (e.g., the values of those data signals Di for which the corresponding latched request signal is active). Thus the data vector can be expressed as $$i_{DATA}=(D0,D1,D2 \ldots ,Dn),$$

and the additional data vector can be expressed as $$i_{VALID}=(R0,R1,R2 \ldots ,Rn).$$

That is, those elements Di of the data vector $i_{DATA}$ are valid for which the corresponding request Ri stored in the additional data vector $i_{VALID}$ is active (e.g., Ri=1). When the FSM has received the data vectors $i_{DATA}$, $i_{VALID}$ a corresponding acknowledge signal ACK is generated and sent back to the arbiter as explained with respect to the general example of FIG. 1. The acknowledge signal ACK is forwarded to those channels for which the an active request signals Ri has been detected, that is $$Ai=ACK \text{ when } Ri=\text{active (for } i=0,1,2, \ldots n).$$

With an arbiter operating as explained above a plurality of input data signals can be processed simultaneously. Only the requests which are successfully forwarded to the FSM 40 are acknowledged back to the sender. The requests which are not captured are processed in the next "cycle." It should be noted, however, that a fixed cycle period is not required. The arbiter and the FSM rather keep one processing request signals as long as any request signal is active. As a result an automatic processing of not-yet-served events (i.e., active requests which have not yet been processed) is accomplished.

Figure 5:
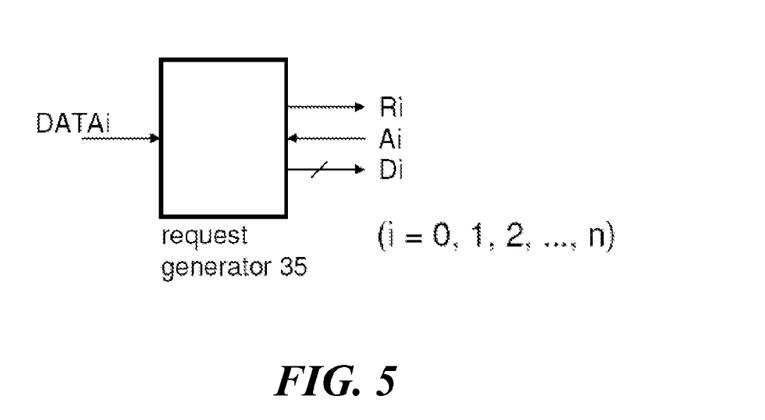
FIG. 5 illustrates one exemplary request generator circuits which may be used in connection with the arbiter of FIG. 4.

FIG. 5 illustrates a "request generator," which is a circuit 35 configured to generate a request signal in response to an actualisation of the data DATAi (i=0, 1, 2, . . . , n). However, separate request generators are not required when the signal source (or sources) that provides the data signals DATAi is capable of providing appropriate request signals corresponding to the data. It should be noted that DATAi may represent a single bit signal or an n-bit signal, e.g., a strobe signal associated with a data word of several bits. One exemplary implementation of the request generator is discussed further below with reference to FIG. 8.

Figure 6:
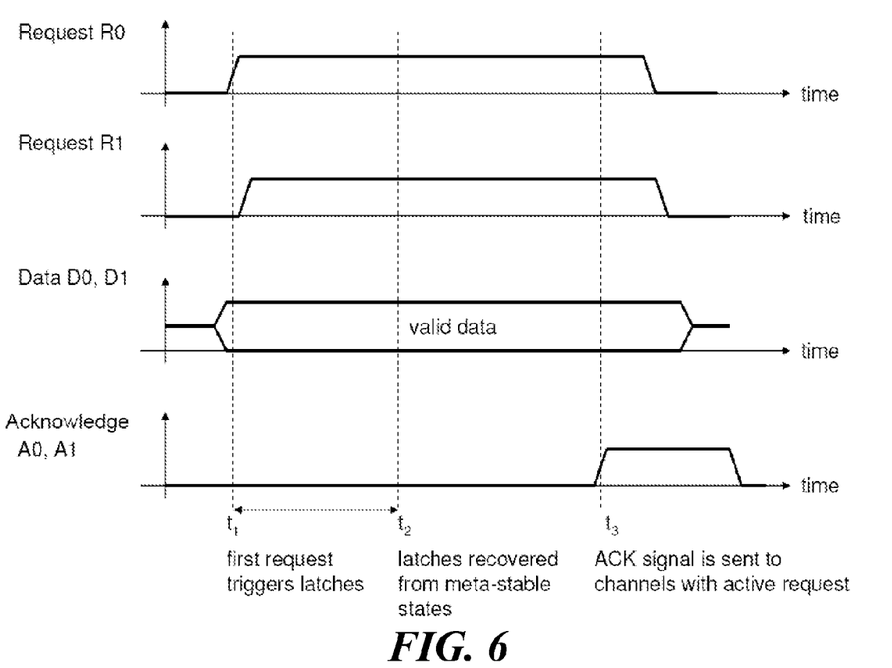
FIG. 6 provides timing diagrams illustrating the function of the arbiter of FIG. 4.

FIG. 6 illustrates the relevant signals (request, data, and acknowledge signals) processed by an arbiter 30 as explained above with reference to FIG. 4. In the present example only two data signals D0 and D1 and two corresponding request signal R0 and R1 as well as two corresponding acknowledge signals A0 and A1 are considered. It should be noted that the data signals D0 and D1 can be considered valid when the corresponding request signals R0 and R1 become active. The two upper diagrams of FIG. 6 illustrate the request signals R0, R1 wherein both requests (rising edges) arrive at the arbiter almost concurrently. The request R1 arrives, however, a little bit later and thus request R0 triggers the latch array at a time instant $t_1$. The arbiter then forwards the latched data and request signals to a subsequent circuit (e.g., the FSM 40 in the example of FIG. 4). To avoid meta-stability effects a pre-defined delay $t_2-t_1$ is waited before generating the "global" request signal REQ (see FIG. 4) which is supplied to the recipient of the data (e.g., the FSM 40). The recipient (e.g., the FSM 40) generates the acknowledge signal ACK when the data has been correctly received. The signal ACK is distributed to the channels for which an active request signal has been captured in the latch array; in the present example of FIG. 6 the ACK signal is distributed to the channels 0 and 1 as signals A0 and A1.

Figure 7:
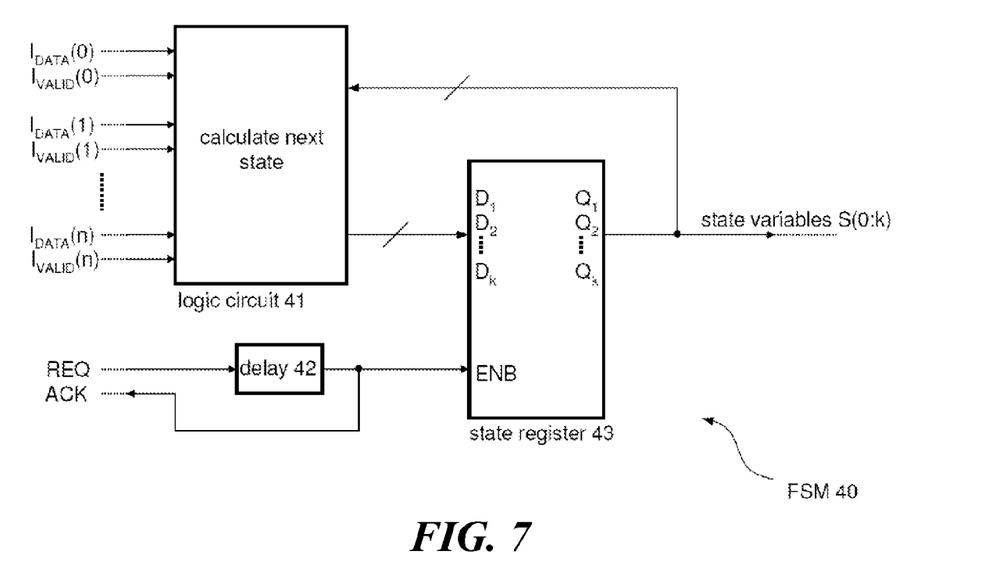
FIG. 7 illustrates one exemplary implementation of the state machine illustrated in the example of FIG. 4.

FIG. 7 illustrates an exemplary implementation of a finite state machine (FSM) 40 which may be used in connection with the arbiter 30 as shown in the example of FIG. 4. The FSM illustrated here is a Mealy-type state machine and includes a logic circuit 41 which is configured to calculate updated state variables S'(0:k) from the current state variables S(0:k) and the inputs given by the vector $i_{VALID}(0:n)$, that is S'(0:k)=f(S(0:k), $i_{VALID}(0:n)$). When the calculation is completed, then the updated state variables S'(0:k) are latched in the state register 43 and thus become the actual state variables S(0:k) which can also be seen as output of the FSM. The latching of the updated state variables S'(0:k) is triggered by a delayed version ENB of the request signal REQ provided by the arbiter 30 (see FIG. 4) wherein the delay (see delay element 42) between the signals REQ and ENB is designed such that the calculation of the updates state variables S'(0:k) has been completed before the signal ENB becomes active and triggers the state register (which can be seen as latch array). The delayed version ENB of the request signal REQ is also supplied back to the arbiter as acknowledge signal ACK to signal that the data vector $i_{VALID}(0:n)$ has been successfully processed and the FSM is ready to receive new data. It should be noted that the implementation presented here is regarded as an example and, e.g., a Muller pipeline may be used to store instead of a flip-flop-based state register.

Figure 8:
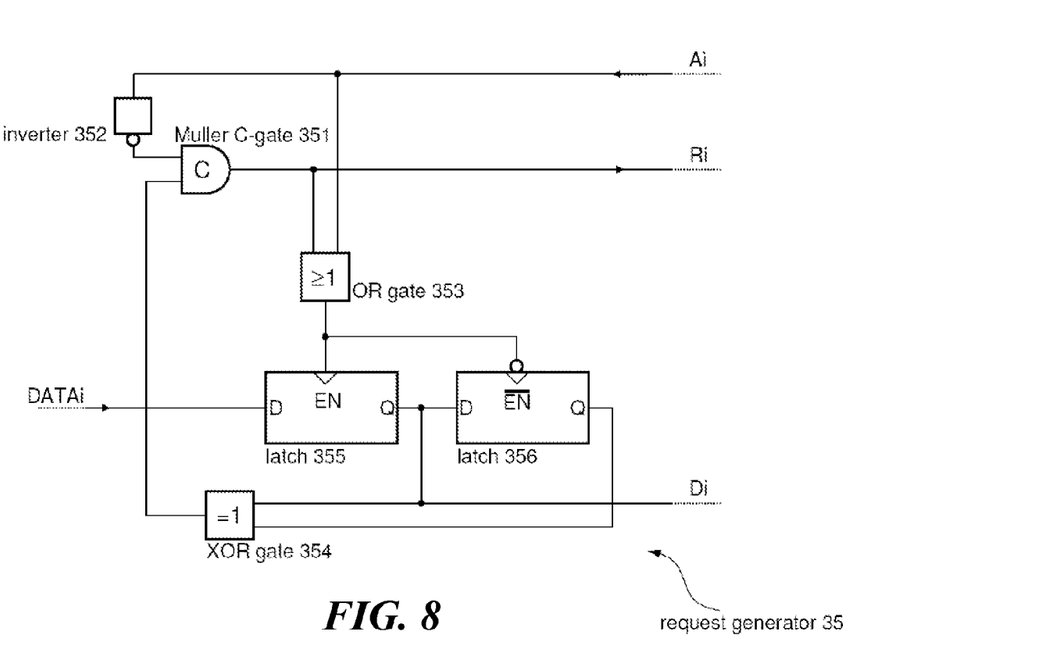
FIG. 8 illustrates one exemplary implementation of the request generator circuit (requestor) of FIG. 5.
Figure 9:
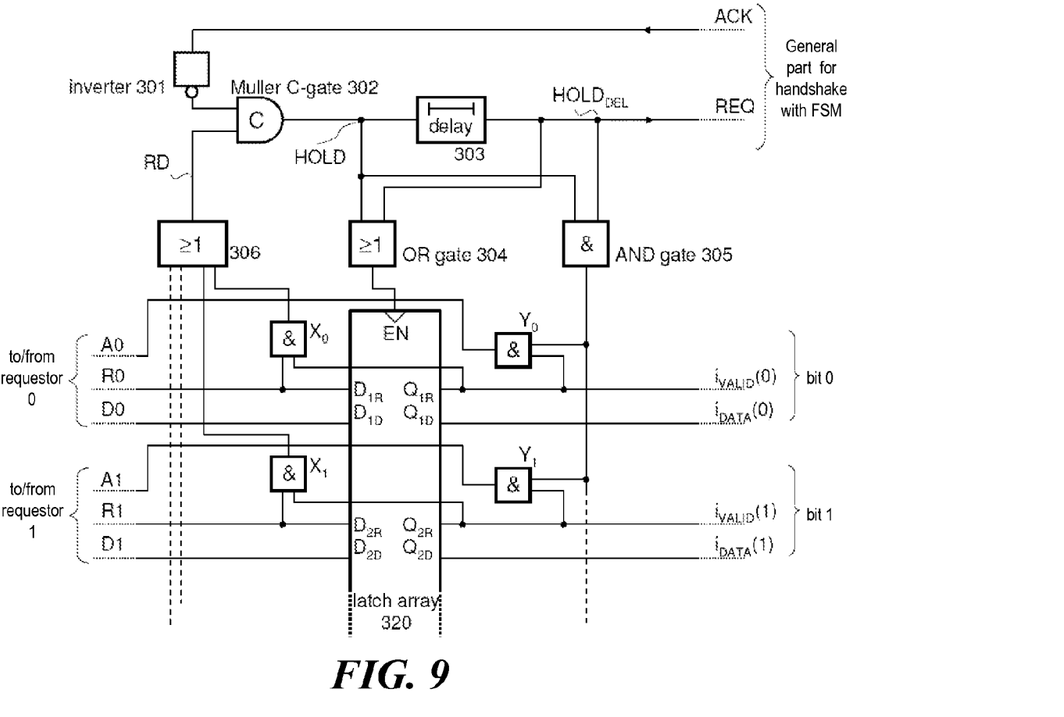
FIG. 9 illustrates one exemplary implementation of the arbiter of FIG. 4.

FIGS. 8 and 9 illustrate exemplary implementations of the request generator circuit 35 of FIG. 5 and the arbiter 40 of FIG. 4, respectively. The request generator circuit 35 receives an input data signal DATAi (e.g., a 1-bit signal in the present example) and provides a corresponding pair of request signal Ri and output data signal Di in response to a transition (high to low and low to high) in the input data signal DATAi. When the request signal Ri is active upon a transition of the input data signal DATAi, then each subsequent transitions are ignored until an acknowledge signal Ai is received. The data signal DATAi is not necessarily a 1-bit signal but may also be a multi-bit signal including a n parallel bits.

FIG. 8 illustrates one exemplary implementation of the request generator 35 depicted in FIG. 5. In a stable state (initiated, e.g., by a signal Ai=1) the output of the OR gate 353 is active (e.g., at a high level) and thus latch 355 is transparent while the latch 356 is in "hold state" (i.e., maintaining the output irrespective of the input). As a result the input data signal DATAi can propagate through the latch 355 and is directly available as data signal Di. The outputs of the two latches 355 and 356 are both supplied as inputs to the XOR gate 354. In the stable state the output of the XOR gate 354 is inactive (i.e., at a low level). However, when the input data DATAi changes its level (i.e., when an edge occurs in the signal DATAi) the output of the transparent latch 355 also changes while the output of the opaque latch 356 is maintained, and thus the output of the XOR gate 354 becomes active (i.e., changes to a high level).

The active output of the XOR gate 354 triggers the Muller C-gate 351 and thus the request signal Ri also becomes active. In such a manner the edge in the input data signal DATAi generates a request. The active request signal Ri causes (via the OR gate 353) the latch 355 to change to a hold state while the latch 356 becomes transparent. At that time the outputs of the two latches are, again, equal and thus the output of the XOR gate 354 returns to an inactive state (low level). When receiving the acknowledge signal Ai the Muller C-gate 351 is again triggered (via inverter 352) and the latches 355 and 356 again change their state (latch 355 becoming transparent and latch 356 holding its output) as the acknowledge signal Ai is forwarded via the OR gate 353 to the latches. At this point the request generator is "free" to again monitor the data signal DATAi and generate the next request upon observing the next edge in the data signal DATAi.

It should be noted that the request generator 35 is configured to generate the data output signal Di a little bit earlier than the corresponding request Ri to allow the arbiter to reliably capture the data Di. This time difference is due to the propagation delay caused by the XOR gate 354 and the Muller C-gate 351.

The arbiter 40 illustrated in FIG. 9 latches the request signals R0, R1, etc. and the data signals D0, D1, etc. in the multi-channel latch 320. The latch is transparent when the enable signal is low (EN=0). In this case the output vector $i_{VALID}$ includes the request signals (i.e., $i_{VALID}=\{R0, R1, \ldots, Rn\}$) and the output vector $i_{DATA}$ includes the data signals (i.e., $i_{DATA}=\{D0, D1, \ldots, Dn\}$). In response to the first request signal Ri that becomes active the latch is triggered (enable signal EN=1), the output values (i.e., the values of the output vectors $i_{VALID}$ and $i_{DATA}$) are "frozen," and the global request signal REQ is generated. The latch 320 is not disabled (i.e., set transparent) until an acknowledge signal ACK is received. A typical signal sequence (i.e., one request-acknowledge-cycle) is described below to illustrate the function of the arbiter of FIG. 9.

Just for illustrative purposes it is assumed that all request and acknowledge signals Ri, Ai, REQ, ACK are initially inactive (Ri=0 and Ai=0 for all relevant values of i, REQ=0, ACK=0). Furthermore, the hold signal HOLD (output of the Muller C-gate 302) is also initially inactive (HOLD=0) and thus the latch-array 320 is transparent. In this situation, the values of the input data signals are not relevant, the output data vector $i_{VALID}$ contains the current values of the input data signals (i.e., $i_{DATA}=\{D0, D1, \ldots, Dn\}$) which is a result of the latch array 320 being transparent.

For the further discussion it is assumed that one of the input data signals and the corresponding request signal becomes active (e.g., D0=1 and, a very short time later, R0=1). As a result of the latch array 320 being transparent the values are forwarded to the latch output and thus $i_{VALID}(0)$ and $i_{DATA}(0)$ become active ($i_{VALID}(0)$=R0=1 and $i_{DATA}(0)$=D0=1). This result causes the output of the AND gate $X_0$ to become active. As the outputs of the AND gates X0, X1, etc. are all supplied (as inputs) to the or gate 306 the output RD of the OR gate 306 becomes active if at least one of the AND gates detects an active request signal (RD is short for "request detected"). That is RD=1 if (and only if) at least one of the request signals Ri is active.

If at least one request is detected (RD=1) then the Muller C-gate 302 switches its output signal HOLD to a high level (HOLD=1). A defined delay time $T_D$ later the delayed HOLD signal $HOLD_{DEL}$ also becomes active (delay element 303). An active HOLD signal also triggers (i.e., closes) the latch via the OR gate 304. As a consequence the latch array outputs $i_{VALID}(0:n)$ and $i_{DATA}(0:n)$ are "frozen" and changes at the latch array inputs have no effect on the output vectors any more.

One of the other latch inputs (i.e., Ri and/or Di, with i>0 in the present example) might have "seen" a transition at the time the latch array 320 has been triggered. In this case the latch array outputs may have become meta-stable. For this reason no action should be taken until these possibly meta-stable latches have recovered. A defined recovery time is ensured by the delay element 303 so that the latches of the latch array 320 have a time $T_D$ for recovering from meta-stable states.

The delayed HOLD signal $HOLD_{DEL}$ is then (after the delay time $T_D$ has elapsed) output as global request signal REQ. At the time the global request signal becomes active, the output of the AND gate 305 becomes active, too, as both signals HOLD and $HOLD_{DEL}$ are now active. As a consequence, all requestors for which an active request signal (in the present example only R0 or $i_{VALID}(0)$, respectively) has been "caught" in the latch array receive a a corresponding active acknowledge signal (in the present example only signal A0) via the AND gates Yi (i=0, 1, . . . n). This can be seen as selective acknowledge for all channel x for which $i_{VALID}(x)$ is active. Upon receiving the (selective) acknowledge signals Ai the corresponding requestors (in the present example the requestor 0) will disable their request signals Ri.

When the FSM that received and processed the arbiter's output vectors $i_{VALID}(0:n)$ and $i_{DATA}(0:n)$ answers by activating the global acknowledge signal ACK the Muller C-gate 302 (which receives the ACK signal via the inverter 301) deactivates its output (HOLD=0). Furthermore, the selective acknowledge signals Ai are deactivated via the AND gate 305 and the AND gates Yi (i=0, 1, . . . n). A delay time TD later the global request REQ (corresponds to $HOLD_{DEL}$) is also deactivated, what causes the latch array 320 to become transparent again (enable signal EN is set to 0 via OR gate 304). In this situation the arbiter is idle and ready to process further requests occurring at any input channel (from any requestor).

Figure 10:
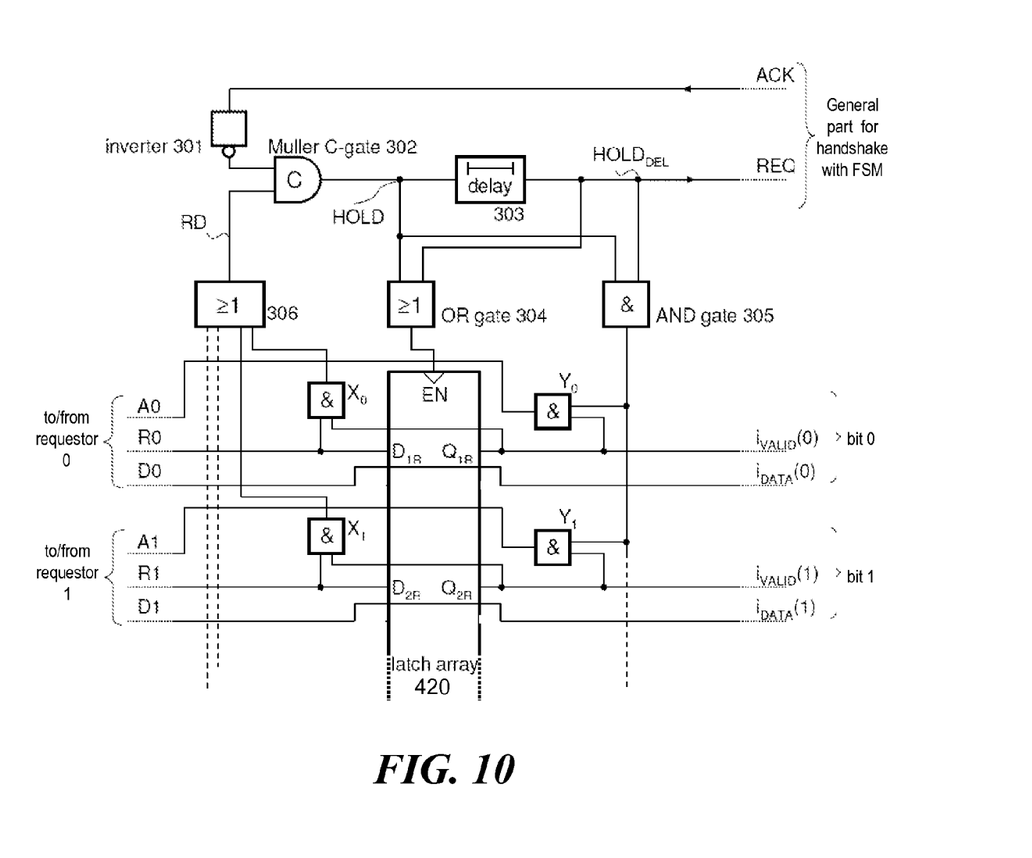
FIG. 10 illustrates a further embodiment implementation of the arbiter of FIG. 4.

FIG. 10 illustrates an arbiter according to a further embodiment in which overclocked data inputs, or data inputs having an input toggle rate that is too fast for request generator 35 to catch the edges, are supported. In such overclocking situations, a timing violation occurs in request generator 35 when a request is issued. This may occur at a rising or falling data edge just as latch 355 is transitioning from a transparent state to a hold state. Such a timing violation may extend the recovery time of the latched data signal in request generator 35 and risk having metastable input clocked into latch array 320 shown in FIG. 9.

The embodiment arbiter of FIG. 10 is similar to the embodiment arbiter of FIG. 9 with the exception that data signals D0 and D1 are passed through to $i_{DATA}(0)$ and $i_{DATA}(1)$, respectively, without being latched. Accordingly, latch array 420 has latches configured to latch request signals R0 and R1 in response to Muller C-gate 302 detecting an assertion of these signals, but does not include latches to latch data signals D0 and D1. Instead, the data signals D0 and D1 are read directly by the FSM in response to global request REQ being asserted. As such, data signals D0 and D1 are not subject to the latch recovery time as shown between times $t_1$ and $t_2$ shown in FIG. 6. It should be understood that FIG. 10 illustrates two channels from requestor 0 and 1 for simplicity of illustration. In embodiments of the present invention, embodiments arbiters may handle any number of parallel requests and accompanying data, as well as generate any number of corresponding acknowledge signals.

In an embodiment, the FSM coupled to the output of arbiter shown in FIG. 10 may be configured to ignore data that corresponds with inactive request generators. Accordingly, the FSM may be configured to evaluate stable data inputs that correspond to active request generators.

Figure 11:
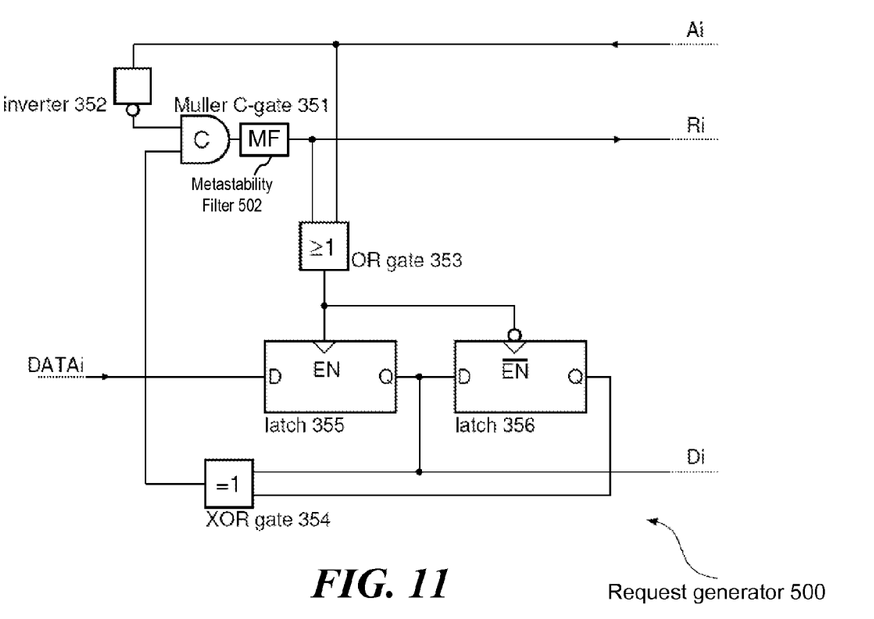
FIG. 11 illustrates a further embodiment implementation of the request generator of FIG. 5.

FIG. 11 illustrates an embodiment request generator 500 that may be used in place of request generator 35 illustrated in FIG. 8. Request generator 500 is similar to request generator 35 with the addition of metastability filter 502 coupled to the output of Muller C-gate 351. In an embodiment, metastability filter 502 filters the output of Muller C-gate 351 to prevent request signal Ri from being asserted when data signal DATAi glitches. This situation may occur, for example, when latch 355 is in a transparent state, and DATAi has only a short glitch instead of a clean, durable transition to the opposite value.

Figure 12:
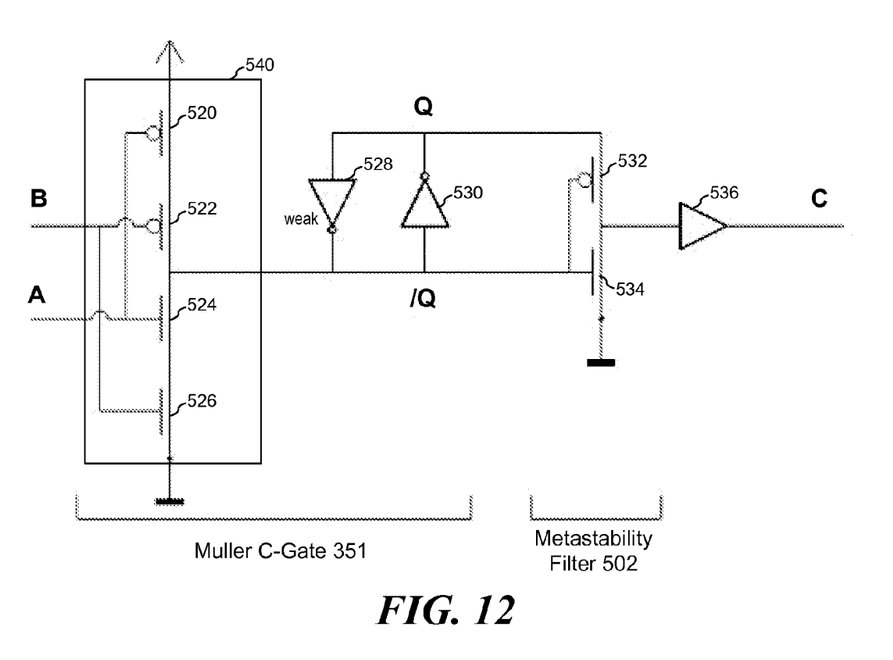
FIG. 12 illustrates a schematic of a portion of an embodiment request generator.

FIG. 12 illustrates a more detailed schematic of an embodiment implementation of Muller C-gate 351 and metastability filter 502 shown in FIG. 11. Optional buffer 536 is shown coupled to the output of metastability filter 502. In an embodiment, Muller C-Gate 351 is implemented using logic gate 540 that includes series connected PMOS transistors 520 and 522 and series connected NMOS transistors 524 and 526. The gates of PMOS transistor 520 and NMOS transistor 524 are coupled to input A and the gates of PMOS transistor 522 and NMOS transistor 526 are coupled to input B. During operation, in a state where both inputs A and B are high, the output of logic gate 540 at node /Q is low; and in a state where both inputs A and B are low, the output of logic gate 540 at node /Q is high. However, when inputs A and B have different logical values, logic gate 540 produces a tri-state or high-impedance output.

In an embodiment, Muller C-gate 351 also includes a static latch implemented using back-to-back inverters 528 and 530. In some embodiments, inverter 528 is weaker than inverter 530 in order to make sure that the output of logic gate 540 is strong enough to overcome the output drive current of inverter 528 to cause a change in output.

Figure 13A:
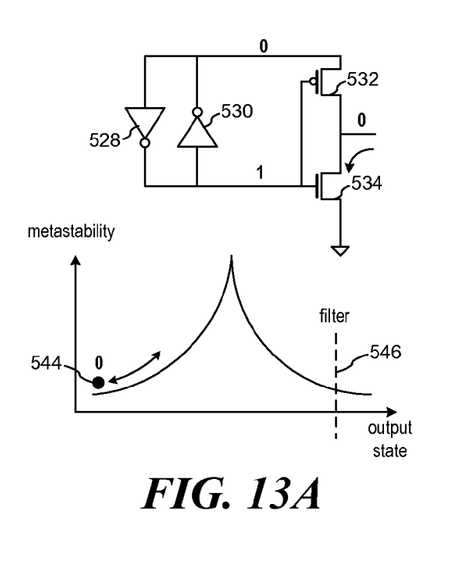
FIGS. 13A-C illustrate an embodiment filtered latch and corresponding exemplary graphs.
Figure 13B:
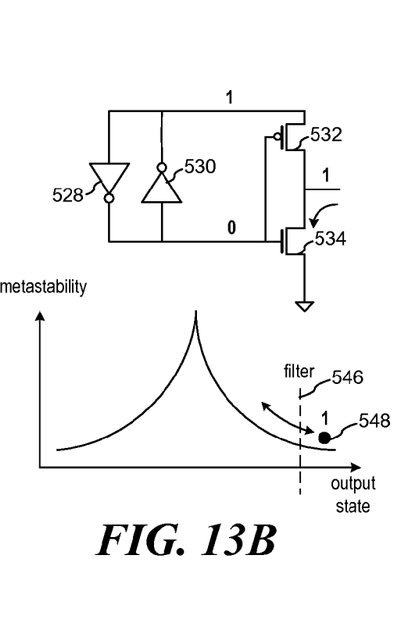
Figure 13C:
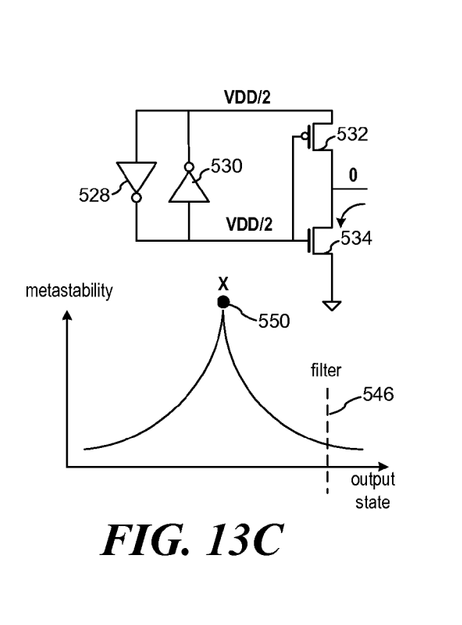

In an embodiment, metastability filter 502 includes PMOS transistor 532 and NMOS transistor 534. FIGS. 13A-C show various scenarios that illustrate the operation of metastability filter 502 in conjunction with inverters 528 and 530. For example, FIG. 13A illustrates the case where the output of inverter 528 is high, and the output of inverter 530 is low. Here, PMOS transistor 532 is turned off because its source is couple to a low voltage, and NMOS transistor 534 pulls its drain low because the gate of NMOS transistor 534 is high. Consequently, the output of the metastability filter is low.

The corresponding graph of metastability (i.e., willingness to change) v. output state shows that the scenario of FIG. 13A operates at point 544, corresponding to a stable operating point. Threshold 546 represents the effect of the metastability filter on the operation of circuit. For example, when the output state representing a unidirectional voltage difference between the outputs of inverters 528 and 530 is less than threshold 546, the output of the metastability filter is low. On the other hand, when the output state is greater than threshold 546, the output of the metastability filter is high.

FIG. 13B illustrates the case where the output of inverter 528 is low, and the output of inverter 530 is high. Here, PMOS transistor 532 is turned on because its source is coupled to a high output of inverter 530 and NMOS transistor 534 is turned off because the gate of NMOS transistor 534 set low. The corresponding graph of metastability v. output state shows that the circuit is operating at stable point 548, which is at a point greater than threshold 546 on the x-axis. Consequently, the output of the metastability circuit is high.

FIG. 13C illustrates the case where the output of inverters 528 and 530 are at about VDD/2 and in a metastable state. As shown, PMOS transistor 532 is turned off because the source of PMOS transistor 532 is at about the same voltage as the gate of PMOS transistor 532. NMOS transistor 534 pulls its drain low because its gate is at VDD/2, which, in this embodiment, is sufficient to turn on NMOS transistor 534. The corresponding graph of metastability v. output state shows that the circuit is operating at metastable point 550, which is at a point that is less than threshold 546 on the x-axis. Consequently, the output of the metastability filter is low. Once the metastable condition of the latch is resolved, the output of the metastability filter will be resolved according to the examples in FIGS. 14A and 14B.

Figure 14:
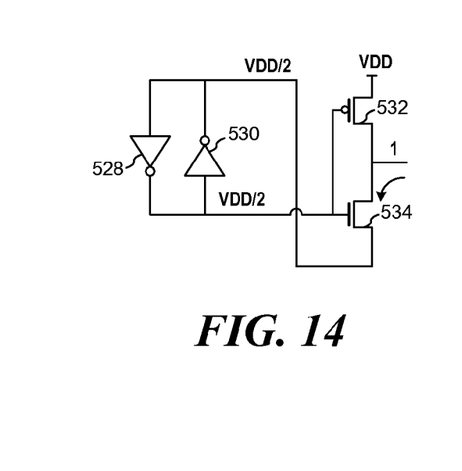
FIG. 14 illustrates an alternative embodiment filtered latch.

It should be understood that metastability filter 502 shown in FIG. 12 and described in FIG. 13 is just one example of many various embodiment metastability filter configurations. In alternative embodiments, the metastability filter may be configured to have the majority of the input state of the metastability filter to map to a high output state rather than the low output state. One example of such an embodiment is illustrated in FIG. 14. In an embodiment, the gates of PMOS transistor 532 and NMOS transistor 534 are coupled to the output of inverter 528, the source of NMOS transistor 534 is coupled to the output inverter 530, and the source of PMOS transistor 532 is coupled to VDD. As shown a metastable condition at the outputs of inverters 528 and 530 maps to a high output state rather than a low output state as is the case with the filtered latch shown in FIGS. 13A-C. In further embodiments, the metastability filter may be implemented using an amplifier, such as an operational amplifier and/or a comparator coupled to the outputs of inverters 528 and 530. In one embodiment, a voltage difference between the outputs of inverters 528 and 530 are compared to a threshold. This threshold may be set, for example, to map a metastable region to a predetermined logic state. In further alternative embodiments, other filtering circuits and methods may be used to map a metastable region to a predetermined output.

Figure 15:
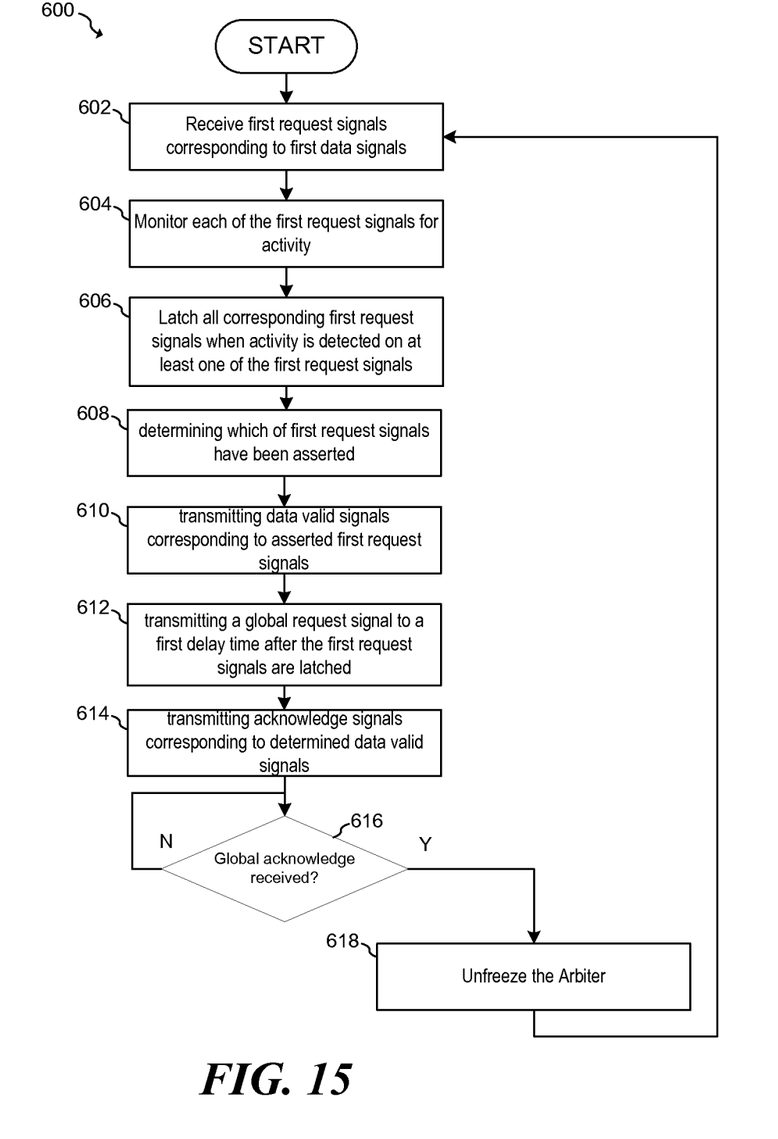
FIG. 15 illustrates a block diagram of an embodiment arbitration method.

FIG. 15 illustrates a flowchart of an embodiment method 600 of operating an arbiter. In step 602, the arbiter receives first request signals corresponding to first data signals. In some embodiments, these request signals are generated by monitoring each individual first data signals. Glitches in these data signals may be suppressed, for example, using a metastability filter as described with respect to FIGS. 12 and 13A-C. In step 604, each of the first request signals are monitored for activity. In some embodiments, an exclusive OR gate is used and a Muller C-gate is used to monitor the first respect signals as described with respect to FIGS. 9 and 11. When activity is detected on at least one of the first request signals, all first request signals are latched in step 606. This step may be performed by changing a state of a latch bank from a transparent state to a hold state.

In step 608, a determination is made as to which of the first request signals have been asserted. This may be performed, for example, by evaluating the output of the latch bank in the hold state. Next, in step 610, data valid signals corresponding to each of the active first request signals are transmitted. A global request signal is transmitted a first delay time after the first request signals are latched in step 612. This global request may be forwarded, for example to FSM 40. In step 614 acknowledge signals corresponding to active or caught request signals are transmitted in step 614. In some embodiments, steps 612 and 614 may occur simultaneously, as FSM may receive the global request at the same time acknowledgement signals as returned to all caught requests.

In step 616, the arbiter waits for a global acknowledge in response to the global request signal. Once this global acknowledge signal is received, the arbiter is unfrozen in step 618, Unfreezing the arbiter may include, for example, making latches in the latch bank transparent and de-asserting the global request and de-asserting that were sent to the caught requests. Operation then returns again to step 602 when first request signals are received.

In accordance with an embodiment, a circuit includes an arbiter is configured to receive first request signals corresponding to first data signals, monitor each of the respective first request signals for activity, latch all corresponding first request signals when activity is detected on at least one of the first request signals, determine which of first request signals have been asserted, transmit data valid signals corresponding to asserted first request signals, transmit a global request signal to a first delay time after the first request signals are latched, and transmit acknowledge signals corresponding to determined data valid signals. Each first request signal is associated with a respective first data signal, In an embodiment, the arbiter is further configured to latch the first data signals when the activity is detected on the at least one of the first request signals. The circuit may further include a finite state machine coupled to the latched first data signals and the data valid signals. The finite state machine is configured to receive the global request signal from the arbiter and transmit an acknowledge signal to the arbiter after receiving the global request signal.

In some embodiments, the arbiter is configured to pass the first data signals to a further circuit. The circuit may include a finite state machine coupled to the first data signals and the data valid signals. In this context, the finite state machine is configured to receive the global request signal from the arbiter and transmit a global acknowledge signal to the arbiter after receiving the global request signal. The arbiter may also accept the passed first data signals that have not been latched.

In an embodiment, the arbiter includes a latch array having a latch for each first request signal. The latch array may also include a latch for each first data signal. The arbiter may also be further configured to receive a global acknowledge signal and deactivate the global request signal after the global request signal is received. In some embodiments, the arbiter monitors each of the first respective request signals by determining an edge transition on the first request signals, setting a static latch when the edge transition is determined and filtering an output of the static latch.

In accordance with a further embodiment, a circuit includes a latch array having a first plurality of latches coupled to a corresponding plurality of first request signals, a first logic gate having inputs coupled to the plurality of first request signals. The first logic gate is configured to determine when at least one of the first request signals is activated. The circuit further includes a transition detection circuit having a first input to an output of the first logic gate, a second input coupled to a global acknowledgement input, and an output coupled to a global request signal terminal and hold terminals of the latch array. The circuit also includes an acknowledgement detection circuit having inputs coupled to the outputs of the first plurality of latches and outputs coupled to first acknowledgement output terminals. In an embodiment, the first logic gate is implemented using an OR gate.

In an embodiment, the latch array is placed in a hold state after the transition detection circuit detects a transition at the output of the first logic gate, and the latch array is placed in a transparent state after the transition detection circuit detects that the global acknowledgement input is asserted. In some embodiments, the acknowledgement detection circuit includes a plurality of AND gates having a first input coupled to a corresponding output of the first plurality of latches, a second input coupled to the global request signal terminal, and an output coupled to a respective one of the first acknowledgement output terminals.

The circuit may further include a plurality of request generators having inputs coupled to a plurality of first data signals and outputs coupled to the corresponding plurality of first request signals. Each of the plurality of request generators includes a first latch having an input coupled to one of the plurality of first data signals, a second latch having an input coupled to an output of the first latch, a first logic gate coupled to outputs of the first latch and the second latch, and a second logic gate having a first input coupled to an output of the first gate and a second input. The first logic gate is configured to determine whether the output of the first latch and the second latch have difference values, and the second logic gate is configured to produce a low output signal when the first and second inputs are in a first state, a high output signal when the first and second inputs are in a second state, and a high impedance output when the first and second inputs are in a third state and in fourth state. Each of the plurality of request generators further includes a static latch coupled to an output of the second logic gate, such that an output of the second gate is coupled to control inputs of the first latch and the second latch.

In an embodiment, each of the plurality of request generators further comprises a metastability filter coupled between the static latch and the control inputs of the first latch and the second latch. The metastability filter may include an inverter having an input coupled to a first terminal of the static latch and a power supply terminal coupled to a second terminal of the static latch.

In an embodiment, the latch array further includes a second plurality of latches coupled to a corresponding plurality of first data signals. The circuit may also include a delay circuit coupled between the output of the transition detection circuit and the global request signal terminal.

In accordance with a further embodiment, a method of operating an arbiter includes receiving first request signals corresponding to first data signals, wherein each first request signal is associated with a respective first data signal. The method also includes monitoring each of the first request signals for activity, latching all first request signals when activity is detected on at least one of the first request signals, determining which of first request signals have been asserted, transmitting data valid signals corresponding to asserted first request signals, transmitting a global request signal to a first delay time after the first request signals are latched, and transmitting acknowledge signals corresponding to determined data valid signals.

The method may further include latching the first data signals when activity is detected on the at least one of the first request signals. Alternatively, the method includes passing the first data signals to a further circuit. The first data signals may be latched by the further circuit in response to the transmitted global request signal.

In accordance with a further embodiment, a circuit includes a first logic gate configured to produce a low output signal when a first input and a second input are in a first digital state, a high output signal when the first input and the second inputs are in a second digital state, and a high impedance output when the first input and the second inputs are in a third digital state and in fourth digital state. The circuit also includes a static latch coupled to an output of the first logic gate, and a metastability filter coupled to the static latch.

In an embodiment, the first logic gate includes a plurality of transistors connected in series between a first reference node and a second reference node. The plurality of transistors may include a first transistor of a first type comprising a control node coupled to the first input, a second transistor of the first type comprising a control node coupled to the second input, a third transistor of a second type comprising a control node coupled to the first input, and a fourth transistor of the second type comprising a control node coupled to the second input. The second type is opposite the first type. The static latch may include a first inverter having an input coupled the output of the first logic gate, and a second inverter having an input coupled to an output of the first inverter and an output coupled to the output of the first logic gate. In an embodiment, the metastability filter includes a fifth transistor of the first type having a first node coupled to the first reference node and a control node coupled to one of the input of the first inverter and the output of the first inverter, and a sixth transistor of the second type having a first node coupled to the second reference node, a second node coupled to a second node of the fifth transistor, and a control node coupled to the other one of the input of the first inverter and the output of the first inverter. In one example embodiment, the first type is NMOS and the second type is PMOS.

In an embodiment, the metastability filter includes an inverter having a supply node coupled to an output of the static latch an input node coupled to one of an input of the static latch and an output of the static latch.

Advantages of some embodiments include the ability to perform arbitration on a data and request vector of arbitrary length, as well as the ability to perform arbitration using data signals that are overclocked and contain glitches. A further advantage of embodiment arbitration systems is the ability to easily synthesize a state machine using an arbiter for handling concurrent events in different channels.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those where not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

What is claimed is:

1. A circuit comprising:
an arbiter configured to:
receive first request signals corresponding to first data signals, wherein each first request signal is associated with a respective first data signal,
monitor each of the respective first request signals for activity;
latch all corresponding first request signals when activity is detected on at least one of the first request signals,
determine which of first request signals have been asserted;
transmit data valid signals corresponding to asserted first request signals,
transmit a global request signal a first delay time after the first request signals are latched, and
transmit acknowledge signals corresponding to determined data valid signals.

2. The circuit of claim 1, wherein the arbiter is further configured to latch the first data signals when the activity is detected on the at least one of the first request signals.

3. The circuit of claim 2, further comprising a finite state machine coupled to the latched first data signals and the data valid signals, the finite state machine configured to receive the global request signal from the arbiter and transmit an acknowledge signal to the arbiter after receiving the global request signal.

4. The circuit of claim 1, wherein the arbiter is configured to pass the first data signals to a further circuit.

5. The circuit of claim 1, further comprising a finite state machine coupled to the first data signals and the data valid signals, the finite state machine configured to receive the global request signal from the arbiter and transmit a global acknowledge signal to the arbiter after receiving the global request signal.

6. The circuit of claim 1, wherein arbiter comprises a latch array having a latch for each first request signal.

7. The circuit of claim 6, wherein the latch array further comprises a latch for each first data signal.

8. The circuit of claim 1, wherein the arbiter is further configured to receive a global acknowledge signal and deactivate the global request signal after the global request signal is received.

9. The circuit of claim 1, wherein the arbiter monitors each of the first respective request signals by determining an edge transition on the first request signals, setting a static latch when the edge transition is determined and filtering an output of the static latch.

10. A circuit comprising:
a latch array comprising a first plurality of latches coupled to a corresponding plurality of first request signals;
a first logic gate having inputs coupled to the plurality of first request signals, the first logic gate configured to determine when at least one of the first request signals are activated;
a transition detection circuit comprising:
a first input to an output of the first logic gate,
a second input coupled to a global acknowledgement input, and
an output coupled to a global request signal terminal and hold terminals of the latch array; and
an acknowledgement detection circuit having inputs coupled to the outputs of the first plurality of latches and outputs coupled to first acknowledgement output terminals.

11. The circuit of claim 10, wherein the first logic gate comprises an OR gate.

12. The circuit of claim 10, wherein the latch array is placed in a hold state after the transition detection circuit detects a transition at the output of the first logic gate, and the latch array is placed in a transparent state after the transition detection circuit detects that the global acknowledgement input is asserted.

13. The circuit of claim 10, wherein the acknowledgement detection circuit comprises a plurality of AND gates having a first input coupled to a corresponding output of the first plurality of latches, a second input coupled to the global request signal terminal, and an output coupled to a respective one of the first acknowledgement output terminals.

14. The circuit of claim 10, further comprising a plurality of request generators having inputs coupled to a plurality of first data signals and outputs coupled to the corresponding plurality of first request signals, wherein each of the plurality of request generators comprises:
a first latch having an input coupled to one of the plurality of first data signals;
a second latch having an input coupled to an output of the first latch;
a first logic gate coupled to outputs of the first latch and the second latch, the first logic gate configured to determine whether the output of the first latch and the second latch have difference values;
a second logic gate having a first input coupled to an output of the first logic gate and a second input, the second logic gate configured to produce a low output signal when the first and second inputs are in a first state, a high output signal when the first and second inputs are in a second state, and a high impedance output when the first and second inputs are in a third state and in fourth state; and
a static latch coupled to an output of the second logic gate, wherein an output of the second logic gate is coupled to control inputs of the first latch and the second latch.

15. The circuit of claim 14, wherein each of the plurality of request generators further comprises a metastability filter coupled between the static latch and the control inputs of the first latch and the second latch.

16. The circuit of claim 15, wherein the metastability filter comprises an inverter having an input coupled to a first terminal of the static latch and a power supply terminal coupled to a second terminal of the static latch.

17. The circuit of claim 10, wherein the latch array further comprises a second plurality of latches coupled to a corresponding plurality of first data signals.

18. The circuit of claim 10, further comprising a delay circuit coupled between the output of the transition detection circuit and the global request signal terminal.

19. A method of operating an arbiter comprising:
receiving first request signals corresponding to first data signals, wherein each first request signal is associated with a respective first data signal;
monitoring each of the first request signals for activity;
latching all first request signals when activity is detected on at least one of the first request signals;
determining which of first request signals have been asserted;
transmitting data valid signals corresponding to asserted first request signals;
transmitting a global request signal a first delay time after the first request signals are latched; and
transmitting acknowledge signals corresponding to determined data valid signals.

20. The method of claim 19, further comprising latching the first data signals when activity is detected on the at least one of the first request signals.

21. The method of claim 19, further comprising passing the first data signals to a further circuit.

22. The method of claim 21, further comprising latching the first data signals by the further circuit in response to the transmitted global request signal.

23. A circuit comprising:
a first logic gate configured to produce a low output signal when a first input and a second input are in a first digital state, a high output signal when the first input and the second inputs are in a second digital state, and a high impedance output when the first input and the second inputs are in a third digital state and in fourth digital state;
a static latch coupled to an output of the first logic gate; and
a metastability filter coupled the static latch, the metastability filter comprising an inverter having a supply node coupled to an output of the static latch and an input node coupled to one of an input of the static latch and an output of the static latch.

24. The circuit of claim 23, wherein:
the first logic gate comprises a plurality of transistors connected in series between a first reference node and a second reference node, the plurality of transistors comprising
a first transistor of a first type comprising a control node coupled to the first input,
a second transistor of the first type comprising a control node coupled to the second input,
a third transistor of a second type comprising a control node coupled to the first input, wherein the second type is opposite the first type, and
a fourth transistor of the second type comprising a control node coupled to the second input;
the static latch comprises
a first inverter having an input coupled the output of the first logic gate, and
a second inverter having an input coupled to an output of the first inverter and an output coupled to the output of the first logic gate; and
the metastability filter comprises
a fifth transistor of the first type having a first node coupled to the first reference node and a control node coupled to one of the input of the first inverter and the output of the first inverter,
a sixth transistor of the second type having a first node coupled to the second reference node, a second node coupled to a second node of the fifth transistor, and a control node coupled to the other one of the input of the first inverter and the output of the first inverter.

25. The circuit of claim 24, wherein the first type is NMOS and the second type is PMOS.

* * * * *